May 19, 1970　　　E. L. MORGAN ETAL　　　3,512,819
CONNECTOR STRUCTURE FOR MODULAR PANELS AND THE LIKE
Filed Sept. 13, 1968
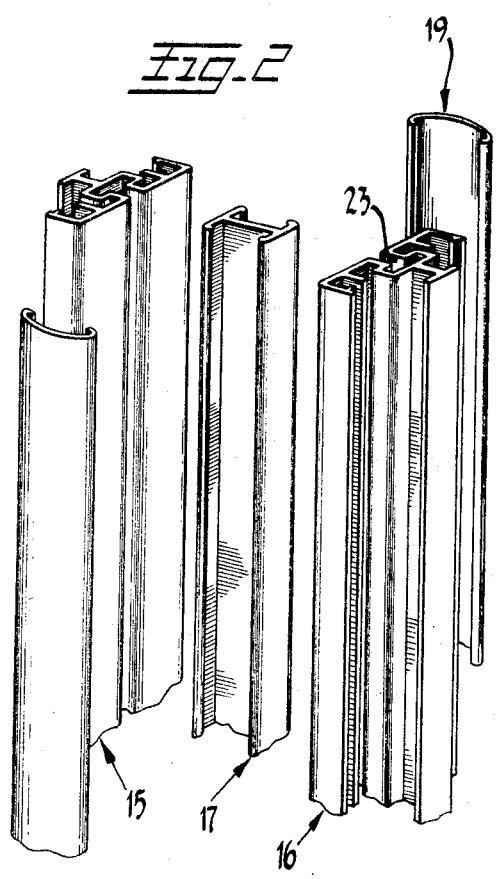
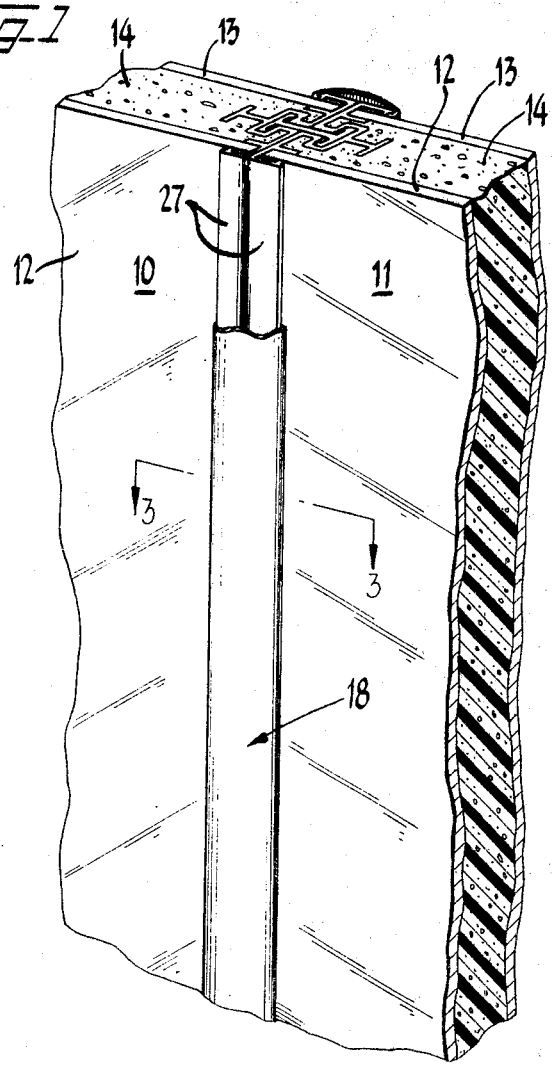
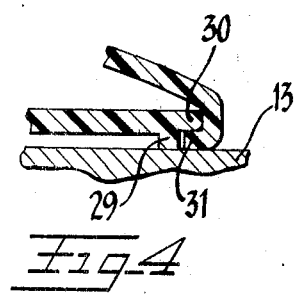
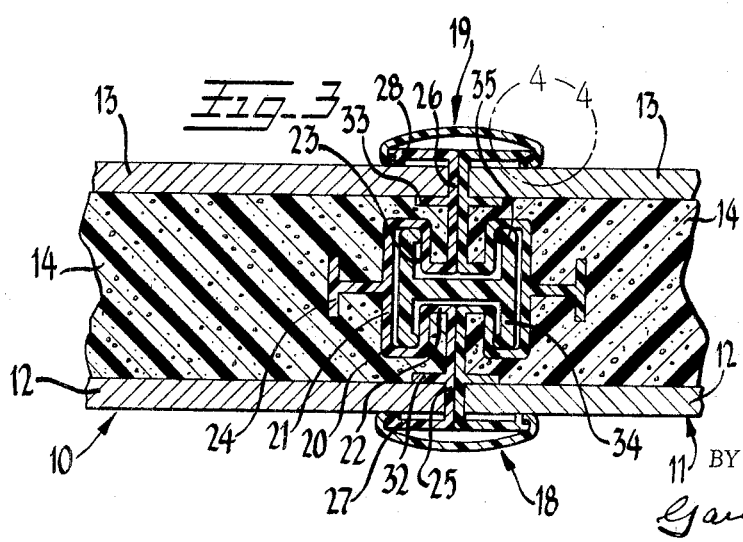
INVENTOR.
EVERETT L. MORGAN
ALFRED G. GILLINGWATER
BY
Gardner & Zimmerman
ATTORNEYS

United States Patent Office 3,512,819
Patented May 19, 1970

3,512,819
CONNECTOR STRUCTURE FOR MODULAR PANELS AND THE LIKE
Everett L. Morgan, Walnut Creek, and Alfred G. Gillingwater, Concord, Calif., assignors to Foamcor, Inc., Benicia, Calif., a corporation of California
Filed Sept. 13, 1968, Ser. No. 759,618
Int. Cl. F16b 5/00
U.S. Cl. 287—189.36                                5 Claims

ABSTRACT OF THE DISCLOSURE

Connector structure for modular building wall panels and the like is described. Modular wall panels for building structures include inner and outer faces formed of standard construction materials, and a core of insulating or similar material sandwiched therebetween. The core of the panels described is foamed-in-place polyurethane self-bonded to the inner and outer faces of the panels, and to a longitudinally extending fastener forming a part of connector structure used to join adjacent panels along longitudinal edge portions thereof. The fastener substantially encloses the longitudinal edge of the associated panel and has a generally T-shaped channel section embedded within the core, such section defining a generally T-shaped channel having its opening along the longitudinal edge of the panel. When a pair of panels are juxtaposed along the longitudinal edge portions thereof, the two channel sections define a channel having generally H-shaped configuration that slidably receives an H-shaped coupling. Such coupling is operative to secure a pair of panels together along such edges. The fasteners have laterally turned flanges overlying the inner and outer faces of the associated panel, and such flanges are equipped with lips cooperative with cover strips which bridge and overlie the joint formed by the connection of two such panels.

---

This invention relates to connector structure and, more particularly, to connector structure for joining a pair of modular panels along longitudinal edge portions thereof. The connector structure is especially applicable to building-wall panels and particularly to insulating panels comprising inner and outer faces sandwiching a layer of thermal insulation therebetween.

Prefabricated wall panels for building structures have long been known as have connector structures for joining two such panels along adjacent edges. Since such connector structures have not been completely satisfactory, a general object of the present invention is to provide an improved connector structure for joining a pair of modular building-wall panels or the like along longitudinal edge portions. Another object of the invention is the provision of an improved connector structure that includes a pair of fasteners respectively associated with the edges of modular panels, and further includes a coupling engageable with such fasteners to confine the panels in juxtaposition along such edges, the coupling having a configuration enabling it to serve as a moisture barrier restricting migration of moisture from one face of the panel to the other and serving also as a relatively strong element reinforcing the connection of the panels.

Still another object of the invention is that of providing a wall panel and connector structure combination in which a foamed-in-place polyurethane or the like core is bonded to the inner and outer faces of the panel and to a fastener element of such connector structure so as to effectively integrate the fastener element and panel faces with the core, the fastener having a laterally projecting protuberance interlockingly engaging the core so as to augment the integration of the core and fastener. A further object is to provide a building wall panel and connector structure arrangement of the character described in which the connector structure includes laterally projecting outer flanges overlying the opposite faces of the associated panels, and in which elongated cover strips are engageable with adjacent flanges so as to overlie and substantially cover the joint defined between a pair of interconnected panels.

Additional objects and advantages of the invention especially as concerns particular features and characteristics therof, will become apparent as the specification proceeds through a description of the embodiment of the invention illustrated in the accompanying drawings, in which:

FIG. 1 is a broken perspective view illustrating a pair of modular panels interconnected in aligned juxtaposition along adjacent longitudinal edge portions thereof;

FIG. 2 is a broken perspective view illustrating the various components of the connector structure in exploded, spaced apart relation;

FIG. 3 is an enlarged, broken cross sectional view taken along the line 3—3 of FIG. 1; and FIG. 4 is an enlarged, fragmentary view of the portion enclosed by the line 4—4 in FIG. 3.

Illustrated in FIG. 1 are a pair of modular panels 10 and 11 adapted to be interconnected along longitudinally extending edge portions thereof. The panels 10 and 11 may be identical as respects the present invention, and in the form shown are structural panels each comprising opposite or inner the outer faces 12 and 13 having a core or layer 14 of material sandwiched therebetween. The particular panels shown are building-wall panels and the faces 12 and 13 thereof may be formed of any conventional building materials which may differ from face to face, especially if a panel is to form an exterior wall of a building structure. Examples of such face materials are hardboard, gypsum board, and plywood as shown in FIG. 3. Preferably, core 14 is a foamed-in-place plastic, such as polyurethane, having good structural and heat insulating properties, and it is bonded to the inner surfaces of the faces 12 and 13. Such bonding is effected by the inherent adhesive properties of the foamed-in-place polyurethane, wherefore the layer 14 is self-bonded to the faces 12 and 13.

The connector structure includes a pair of fasteners 15 and 16 respectively associated with the panels 10 and 11, a coupling 17 operative to interconnect the fasteners 15 and 16 and thereby confine the panels 10 and 11 in aligned juxtaposition along longitudinal edge portions thereof (as shown in FIG. 1 and 3), and a pair of cover strips 18 and 19 adapted to bridge and thereby substantially cover the joint or line of mergence defined between such panels 10 and 11. The fasteners 15 and 16 are identical, as are the cover strips 18 and 19, and the fasteners and the coupling 17 are relatively stiff components which may be formed of various materials including a metal such as aluminum and any one of the many suitable plastics (as shown) such as polyvinyl chloride. In either case, the fasteners and coupling may be extruded components. The cover strips 18 and 19 are sufficiently stiff to be self-sustaining but have adequate flexibility to enable the same to be interconnected with the fasteners 15 and 16, as shown in FIGS. 1 and 3. Various materials may be employed to form the cover strips, and an exemplary material is polyvinyl chloride.

Each fastener includes a channel section 20 of generally T-shaped configuration having a cross bar element 21 and a stem element 22. The cross bar element 21 is embedded within the associated layer 14 of insulating material, and the stem 22 extends along the longitudinal edge portion of the associated modular panel. Accordingly, when the panels 10 and 11 are disposed in aligned juxtaposition, as shown in FIG. 3, the two channel sections 20 together define a generally H-shaped configuration (or generally I-shaped configuration depending upon how the structure is viewed). The T-shaped channel defined by the cross bar 21 and stem 22 of each channel 20 is denoted with the numeral 23 and opens along the stem. Projecting laterally from the cross bar 21 of the channel 20 is a protuberance 24 embedded within the insulating layer 14 of the associated panel, and in the form shown such protuberance has a generally T-shaped geometric definition in cross section. Thus, the protuberance 24 provides a relatively large surface area in engagement with the layer 14 and actually confines portions of such layer between it and the channel 20.

Each fastener is turned transversely in opposite directions at the outer end of its stem element 22 to provide two legs or branches 25 and 26 that extend along the longitudinal edge of the associated panel and substantially enclose or cover such edge. Adjacent their outer ends, the legs 25 and 26 are turned laterally and are equipped with outer flanges 27 and 28 that respectively overlie the adjacent faces 12 and 13 of the associated panel. As shown most clearly in FIG. 4, each such flange has an inwardly facing rib 29 that abuts the adjacent panel face and thereby spaces the flange from the panel so as to define a lip 30 along the edge of the flange outwardly from the rib 29 thereof. Each lip 30 is cooperative with an inwardly turned edge portion 31 of the associated cover strip 18 or 19, as the case may be, to confine such cover strip in bridging relation with the juncture of the panels 10 and 11, as shown in FIGS. 1 and 3.

Also extending laterally from the legs 25 and 26 are a pair of transversely spaced inner flanges 32 and 33 which underlie the respectively associated faces 12 and 13. Thus, the face 12 seats along an edge thereof within the opening defined between the paired outer and inner flanges 27 and 32 so as to be held therebetween and, similarly, the face 13 is held along an edge between the paired outer and inner flanges 28 and 33. As indicated best in FIGS. 1 and 2, the fasteners 15 and 16 extend along the longitudinal edge portions of the panels 10 and 11, respectively substantially from end to end thereof. Such fasteners enclose such edges, thereby providing a moisture barrier therefor. The core 14 is self-bonded to the associated fastener, and therefore it effectively integrates therewith the fastener and the associated faces 12 and 13.

The coupling 17 has a generally H-shaped configuration and it is slidably engageable with the fasteners 15 and 16 so as to join the same and thereby rigidly secure a pair of panels 10 and 11 in juxtaposition along longitudinal edge portions thereof. The coupling 17 is relatively stiff and thereby serves to reinforce and strengthen the panels along the interconnected edges, and it also serves as a moisture barrier to prevent migration of moisture from one face of the adjoined panels to the opposite face. The fasteners 15 and 16 and coupling 17 are so arranged that the coupling tends to draw the adjacent legs or branches 25 and 26 into contiguous relation when inserted into the channel sections 20. To facilitate insertion of the coupling by minimizing the frictional inhibition to longitudinal movement thereof along the channels, the flanges 34 of the coupling are provided at the opposite ends thereof with slightly projecting ribs or runners 35 that define restricted areas of slidable engagement of the coupling with the channels.

The cover strips 18 and 19 are most readily mounted upon the respectively associated flanges 27 and 28 of adjoined fasteners by engaging one edge portion 31 of the cover strip beneath a lip 30 of the associated flange, as shown in FIG. 4, and then depressing the center portion of the cover strip to elongate it laterally and thereby enable the opposite edge 31 to be inserted beneath the opposite lip 30 of the associated flanges. Upon release of the center portion of a cover strip, it returns to and assumes the arcuate configuration shown in the drawings and thereby maintains its interconnected relationship with the flanges. In bridging and overlying the line of mergence between adjacent panels, the cover strips form a moisture barrier therealong.

In the form shown, the building panels 10 and 11 are disposed in aligned juxtaposition in which they extend in planar or parallel relation. It will be apparent, however, that the panels might be disposed at various orientations with respect to one another including a right-angle positioning thereof. In such a right angular relationship, the H-shaped configuration of the cooperative channels 23 and coupling 17 would be distorted or elongated to accommodate the angular disposition of the panels. The wall panels 10 and 11 may have any conventional construction including fire stops, diagonal braces, top and bottom frame components, and any reinforcing beams and studs that might be desired. Ordinarily, the faces 12 and 13 are relatively stiff components and thereby protect the usually softer core or layer 14 of insulating material sandwiched therebetween. Where the fasteners 15 and 16 are formed of one of the plastics having poor heat conductivity, migration of heat from one face of the panel to the other is restricted thereby, and this further makes the joint between interconnected panels weather-proof and prevents condensation of moisture that otherwise might result from rapid heat transfer across the joint.

While in the foregoing specification an embodiment of the invention is illustrated in considerable detail for purposes of making a complete disclosure thereof, it will be apparent to those skilled in the art that numerous changes may be made in such details without departing from the spirit and principles of the invention.

What is claimed is:

1. In combination with a pair of modular building wall panels or the like adapted to be joined along juxtaposed longitudinal edge portions thereof and each comprising transversely spaced inner and outer faces and an integrating core sandwiched therebetween, connector structure including a pair of fasteners respectively associated with said panels and extending longitudinally along such edge portions substantially from end to end thereof and covering the same in transverse extent, each of said fasteners having a channel section defining a generally T-shaped channel in which the stem component thereof extends laterally inwardly from such edge portion of the associated panel toward the interior thereof and provides a restricted opening into the channel along such edge whereby the two T-shaped channels of successive panels together form a generally H-shaped configuration when such edge portions of such panels are juxtaposed, the cross bar component of each T-shaped channel being spaced laterally inwardly from the longitudinal edge of the associated panel and transversely disposed with respect thereto so to be embedded within the integrating core, each of said fasteners also having a generally T-shaped protuberance projecting laterally inwardly from the associated channel section with the stem in general alignment with the stem of the channel section and the cross bar component being of sufficient transverse extent to overlie the stem of said T-shaped channel section and be embedded within said integrating core, and said connector structure further including a generally H-shaped coupling slidable into said channel sections so as to extend substantially from end to end thereof to confine said modular panels in juxtaposition along such edge portions, the core of each panel being bonded to the inner and outer faces thereof and to the associated fastener so as to integrate these major elements of each such panel and enable such bonding to be substantially the only structural interconnection of such major elements.

2. The combination of claim 1 in which each of said fasteners is provided with a pair of transversely spaced laterally projecting outer flanges respectively overlying the inner and outer faces of the associated panel.

3. The combination of claim 2 and further comprising a pair of cover strips grippingly engageable with the adjacent outer flanges provided by a pair of interconnected panels so as to substantially cover the juxtaposed longitudinal edge portions thereof.

4. The combination of claim 2 in which each of said fasteners is further provided with a pair of transversely spaced laterally projecting inner flanges respectively underlying the inner and outer faces of the associated panel.

5. The combination of claim 4 in which each of said outer flanges is provided with a laterally projecting lip, and further comprising a pair of cover strips grippingly engageable with the lips of adjacent flanges provided by a pair of interconnected panels so as to substantially cover the juxtaposed longitudinal edge portions thereof.

References Cited

UNITED STATES PATENTS

| | | | |
|---|---|---|---|
| 2,228,363 | 1/1941 | Pinney | 52—580 |
| 2,268,636 | 1/1942 | Becker | 52—580 |
| 3,001,613 | 9/1961 | McBerty | 52—580 |
| 3,239,986 | 3/1966 | Russell | 52—580 |
| 3,359,022 | 12/1967 | Russell | 52—586 |
| 3,365,851 | 1/1968 | Cushman | 52—580 |

FOREIGN PATENTS 1,000,616   8/1965   Great Britain.

MARION PARSONS, Jr., Primary Examiner

U.S. Cl. X.R.

52—465, 586, 309